(12) United States Patent  
Fukutomi

(10) Patent No.: US 9,210,389 B2  
(45) Date of Patent: Dec. 8, 2015

(54) PROJECTION-TYPE IMAGE DISPLAY APPARATUS

(71) Applicant: JVC KENWOOD CORPORATION, Yokohama-shi, Kanagawa (JP)

(72) Inventor: Hironobu Fukutomi, Yokosuka (JP)

(73) Assignee: JVC KENWOOD CORPORATION, Yokohama-Shi (JP)

( * ) Notice: Subject to any disclaimer, the term of this patent is extended or adjusted under 35 U.S.C. 154(b) by 81 days.

(21) Appl. No.: 13/767,306

(22) Filed: Feb. 14, 2013

(65) Prior Publication Data

US 2013/0215335 A1 Aug. 22, 2013

(30) Foreign Application Priority Data

Feb. 16, 2012 (JP) .................... 2012-031548

(51) Int. Cl.
*G03B 21/28* (2006.01)
*H04N 9/31* (2006.01)

(52) U.S. Cl.
CPC ........... *H04N 9/3182* (2013.01); *H04N 9/3155* (2013.01)

(58) Field of Classification Search
CPC .................................. G02B 5/30; G03B 21/28
USPC .......................................................... 353/97
See application file for complete search history.

(56) References Cited

U.S. PATENT DOCUMENTS

| 2003/0142275 | A1* | 7/2003 | Yoshida | 353/31 |
| 2004/0246242 | A1* | 12/2004 | Sasaki | 345/204 |
| 2006/0146005 | A1* | 7/2006 | Baba et al. | 345/102 |
| 2006/0181687 | A1* | 8/2006 | Matsuda | 353/69 |

FOREIGN PATENT DOCUMENTS

| JP | 2001296841 A | 10/2001 |
| JP | 2003162002 A | 6/2003 |
| JP | 2003177374 A | 6/2003 |
| JP | 2003241311 A | 8/2003 |
| JP | 2004151674 A | 5/2004 |
| JP | 2004325628 A | 11/2004 |
| JP | 2005156611 A | 6/2005 |
| JP | 2006189661 A | 7/2006 |
| JP | 4831722 B2 | 12/2011 |
| WO | 2011/010357 A1 | 1/2011 |

OTHER PUBLICATIONS

Japanese Office Action issued Jan. 27, 2015 in counterpart Japanese Application No. 2012-031548.

* cited by examiner

*Primary Examiner* — William C Dowling
*Assistant Examiner* — Jerry Brooks
(74) *Attorney, Agent, or Firm* — Nath, Goldberg & Meyer; Jerald L. Meyer; Stanley N. Protigal

(57) ABSTRACT

A dynamic iris controller includes: a diaphragm and video-image controller including a video-image analyzer analyzing a picture signal, an association setting unit setting a diaphragm stop of a diaphragm mechanism, a color balance correction value, and a lightness correction value according to analysis data analyzed in the video-image analyzer, and a black period controller setting a black period in the picture signal according to a predetermined black time length; a diaphragm driver outputting a drive signal to the diaphragm mechanism so as to set the diaphragm stop of the diaphragm mechanism to be fully closed for the black period set by the black period controller and to set the diaphragm stop to have a value set by the association setting unit for the other period; and a video-image processor correcting color balance and lightness of the picture signal using the correction data set in the association setting unit.

6 Claims, 4 Drawing Sheets

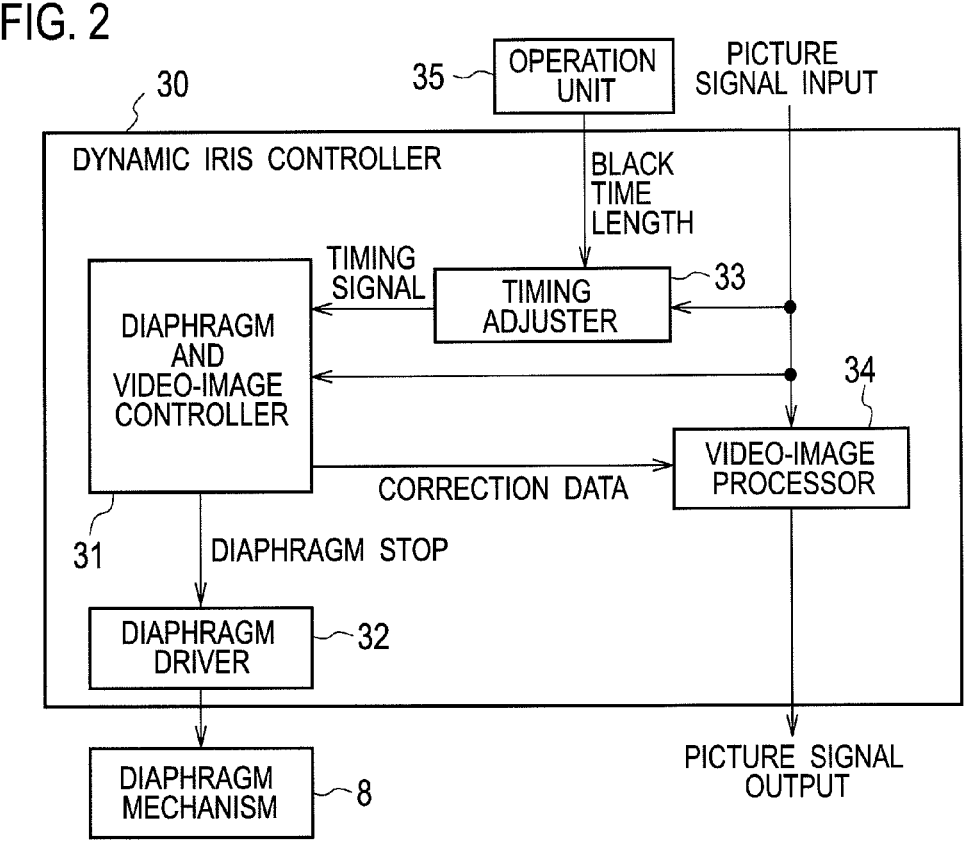
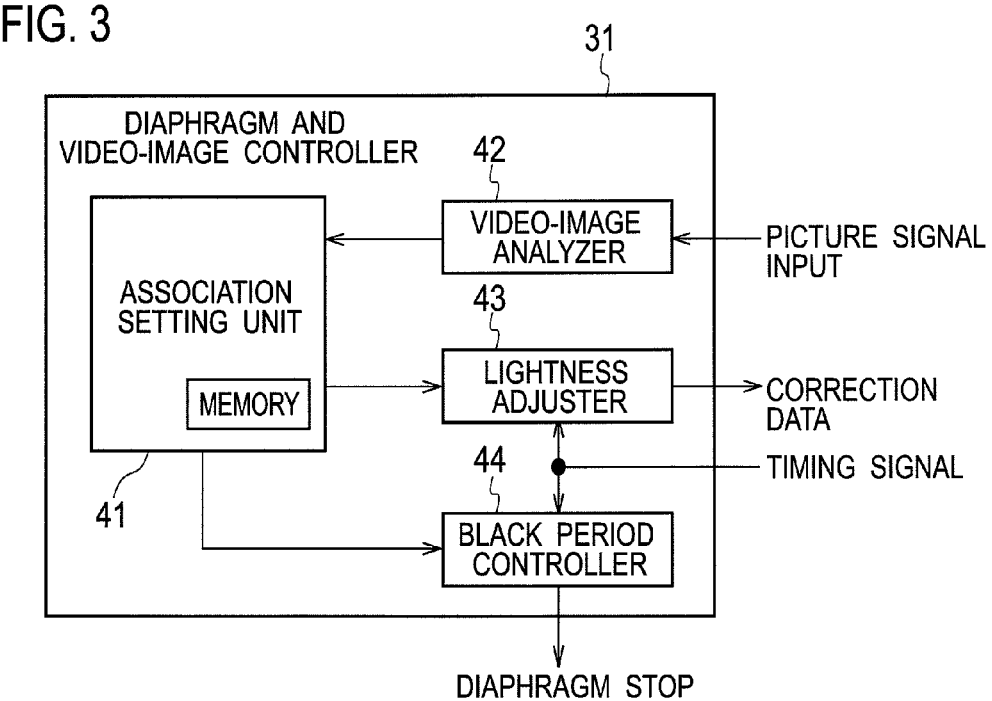

| ANALYSIS DATA | DIAPHRAGM STOP | COLOR BALANCE CORRECTION VALUE | LIGHTNESS CORRECTION VALUE |
|---|---|---|---|
| A0 | S10 | C0 | Y0 |
| A1 | S11 | C1 | Y1 |
| A2 | S12 | C2 | Y2 |
| A3 | S13 | C3 | Y3 |

PROJECTION-TYPE IMAGE DISPLAY APPARATUS

CROSS REFERENCE TO RELATED APPLICATION

This application claims benefit of priority under 35 U.S.C. §119 to Japanese Patent Application No. 2012-031548 filed on Feb. 16, 2012, the entire contents of which are incorporated by reference herein.

BACKGROUND

The present invention relates to a projection-type image display apparatus that projects an image onto a screen or the like, and particularly relates to a technique for improving image quality.

A projection-type image display apparatus that projects an image onto a screen or the like is configured to adjust brightness of an image to be projected and improve a contrast performance by providing an diaphragm mechanism to adjust a light ray transmission amount in an illumination system or a projection system (For example, refer to Patent Document 1: Japanese Patent Application Laid-Open Publication No. 2003-241311). Further, there is also employed a method to improve an apparent dynamic contrast by controlling a diaphragm stop of the diaphragm mechanism in conjunction with a picture signal.

Meanwhile, in a projection-type image display apparatus using a liquid crystal device, there arises a problem such as moving image blurring due to a poor response characteristic of liquid crystal, and it is pointed out that a moving image performance is not satisfactory. Accordingly, efforts to improve the moving image performance have been made by increasing a frame frequency for image display or inserting a black signal between frames.

However, when the method of increasing the frame frequency is employed to improve the moving image performance, image switching speed is increased and therefore sometimes it becomes difficult to keep a sufficient time for the response of liquid crystal, and a negative influence is caused in a brightness performance. Further, when the method of inserting the black signal is employed, it is necessary to input the black signal in an earlier timing when the response characteristic of the liquid crystal is poor, and therefore a negative influence is also caused in brightness.

SUMMARY

The present invention has been achieved for solving such a conventional problem, and aims to provide a projection-type image display apparatus in which moving image performance and contrast can be improved for a picture signal.

In order to achieve the above-described object, according to an aspect of the present invention, there is provided a projection-type image display apparatus that controls an amount of light emitted from a light source with a diaphragm mechanism and projects a video image output from a projection lens onto a screen, the apparatus comprising a controller configured to control the diaphragm mechanism, wherein the controller includes: a video-image analyzer configured to analyze a picture signal; a setting unit configured to set a diaphragm stop of the diaphragm mechanism, a color balance correction value, and a lightness correction value according to analysis data analyzed in the video-image analyzer; a black period controller configured to set a black period in the picture signal according to a predetermined black time length; a diaphragm driver configured to output a drive signal to the diaphragm mechanism so as to set the diaphragm stop of the diaphragm mechanism to be fully closed for the black period set by the black period controller and to set the diaphragm stop to have a value set by the setting unit for a period other than the black period; and a video-image processor configured to correct color balance and lightness of the picture signal using the color balance correction value and the lightness correction value set by the setting unit.

In the projection-type image display apparatus of the present invention, when a black time length is obtained, a black period is set in the picture signal according to the black time length and a diaphragm stop of the diaphragm mechanism is fully closed during the black period to provide a black image. Accordingly, it is possible to improve a dynamic performance of the picture signal and to display an image clearly. Further, since a diaphragm stop is set to have a value for the period other than the black period according to the analysis data, it is possible to improve contrast. Furthermore, since the color balance correction value and the lightness correction value are set according to the diaphragm stop to correct the color balance and the lightness, it becomes possible to prevent image quality degradation caused by the change of the diaphragm stop. As a result, the present invention is utilized for improving a dynamic performance of a video image and for improving image contrast by controlling the diaphragm mechanism without image degradation.

BRIEF DESCRIPTION OF THE DRAWINGS

FIG. 2 is a block diagram showing a detailed configuration of a dynamic iris controller.

FIG. 3 is a block diagram showing a detailed configuration of a diaphragm controller.

DETAILED DESCRIPTION

Figure 1:
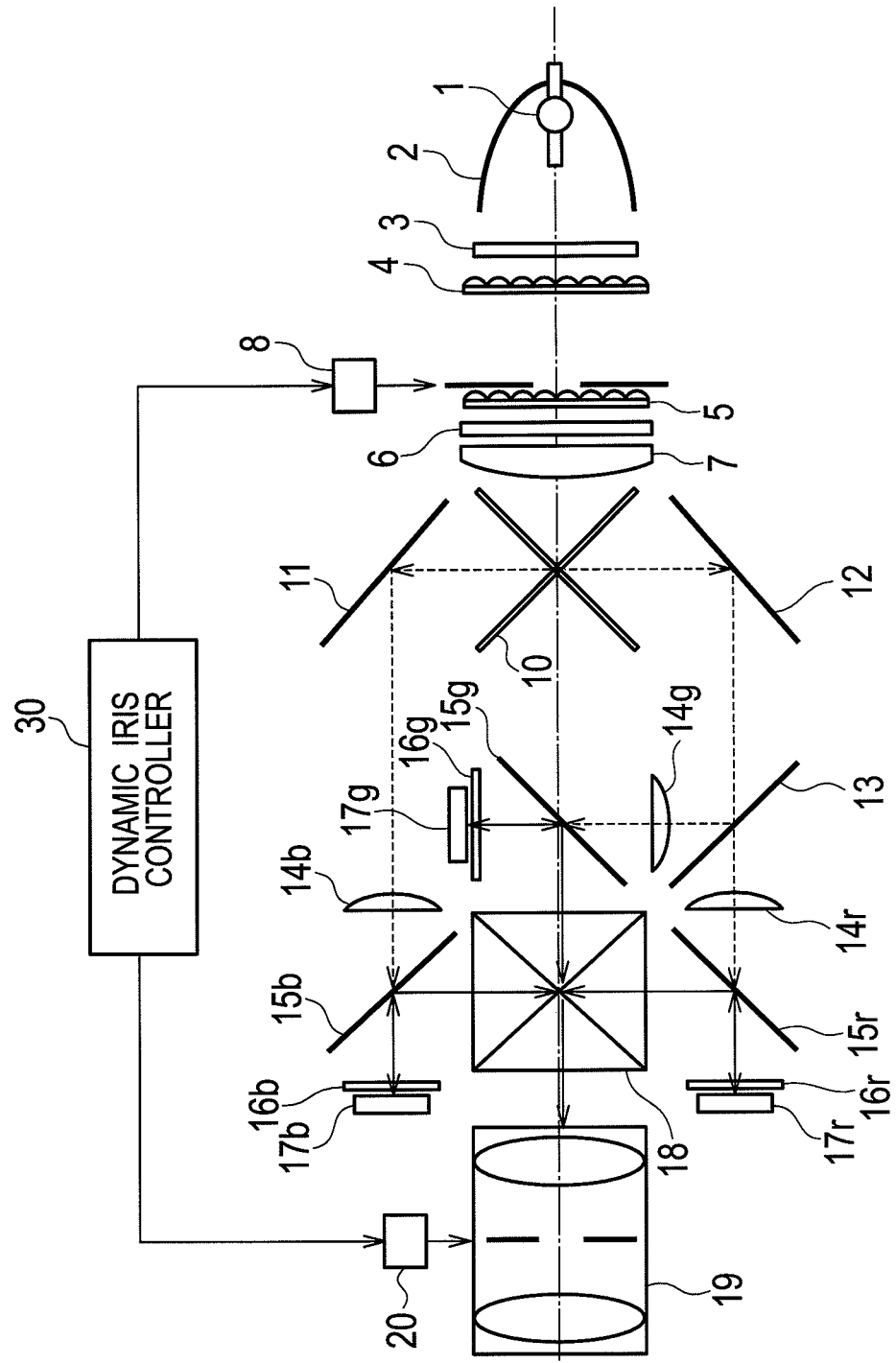
FIG. 1 is an explanatory diagram schematically showing a configuration of a projection-type image display apparatus according an embodiment of the present invention.

Hereinafter, an embodiment of the present invention will be explained referring to the drawings. FIG. 1 is an explanatory diagram schematically showing a configuration of a projection-type image display apparatus according to the present embodiment. As shown in the drawing, this projection-type image display apparatus includes a discharge lamp 1 emitting light, a reflector 2 which has a reflection plane forming a revolution paraboloid and reflects the light emitted from the discharge lamp 1, a cold filter 3 disposed on a light path of the light reflected by the reflector 2, a first lens array 4, a first diaphragm mechanism 8, a second lens array 5, a polarization converter 6, and an overlap lens 7.

The cold filter 3 eliminates ultraviolet light and infrared light included in the light reflected by the reflector 2. The first lens array 4 is configured by two-dimensionally arranging a plurality of lens cells each having a rectangular shape similar to a display region of a reflection-type liquid crystal display element 17b, 17g, or 17r which is a spatial modulator to be explained below, so as to spatially divide an aperture from which the reflector 2 outputs a luminous flux.

The first lens array 4 collects illumination light onto lens cells of the second lens array 5 which correspond to the respective lens cells of the first lens array 4, and forms secondary light source images, the number of which is the same as the number of the lens cells of the first lens array 4, on the second lens array 5.

The illumination light having passed through the first lens array 4 enters the second lens array (fly-eye lens) 5. In the second lens array 5, each lens cell of the second lens array 5 forms an aperture image of the corresponding lens cell of the first lens array 4 on a display surface of the reflection-type liquid crystal display element 17b, 17g, or 17r.

The first diaphragm mechanism 8 is provided between the first lens array 4 and the second lens array 5. The first diaphragm mechanism 8 has the diaphragm stop controlled by the dynamic iris controller 30, and can adjust contrast and brightness of a display image of the projection-type image display apparatus by blocking a part of the luminous flux of the illumination light. The first diaphragm mechanism 8 is disposed in the vicinity of the second lens array 5 on which the secondary light source image is formed.

The illumination light output from the second lens array 5 enters the polarization converter 6. The polarization converter 6 is an optical element formed into a planar shape by arranging polarization beam splitters in parallel, and converts incident light having random polarization directions into polarized light having a certain polarization direction. Accordingly, the polarization converter 6 outputs polarized light having a certain polarization direction.

The polarized light (referred to as P-polarized light) output from the polarization converter 6 enters the overlap lens 7. The overlap lens 7 causes the centers of the respective lens cell images of the first lens array 4 to coincide with the centers of the reflection-type liquid crystal display elements 17b, 17g, and 17r, and performs adjustment so as to cause the respective lens cell images of the first lens array 4 to overlap on the display surfaces of the reflection-type liquid crystal display elements 17b, 17g, and 17r.

The P-polarized light output from the overlap lens 7 is separated into blue light and red-green light by a B-RG separation cross-dichroic mirror 10. The light path of the blue light is bent by a B mirror 11, and the blue light, after having passed through a blue field lens 14b, a blue WG-PBS 15b, and a blue waveplate 16b, enters the blue liquid crystal display element 17b. Further, an S-polarization component reflected and modulated by the blue liquid crystal display element 17b is reflected by the blue WG-PBS 15b and travels toward a cross-dichroic prism 18.

Meanwhile, the light path of the red-green light separated by the B-RG separation cross-dichroic mirror 10 is bent by an RG mirror 12 and the red-green light is separated into red light and green light by an RG dichroic mirror 13. The red light and the green light, as with the blue light, pass through field lenses 14r and 14g, WG-PBSes 15r and 15g, and waveplates 16r and 16g, and enter the reflection-type liquid crystal display elements 17r and 17g, respectively. Further, S-polarization components reflected and modulated by the reflection-type liquid crystal display elements 17r and 17g are reflected by the WG-PBSes 15r and 15g, respectively, and travel toward the cross-dichroic prism 18.

Then, the three color light beams are combined in the cross-dichroic prism 18, and projected on to a screen by a projection lens 19. The projection lens 19 includes a second diaphragm mechanism 20.

Moreover, when the light includes various wavelengths and spread of the light is not uniform for each wavelength in the above configuration, there is a case that color balance of the picture signal to be projected by the projection lens 19 is broken when the diaphragm stop of the diaphragm mechanism 8 is changed.

Figure 6:
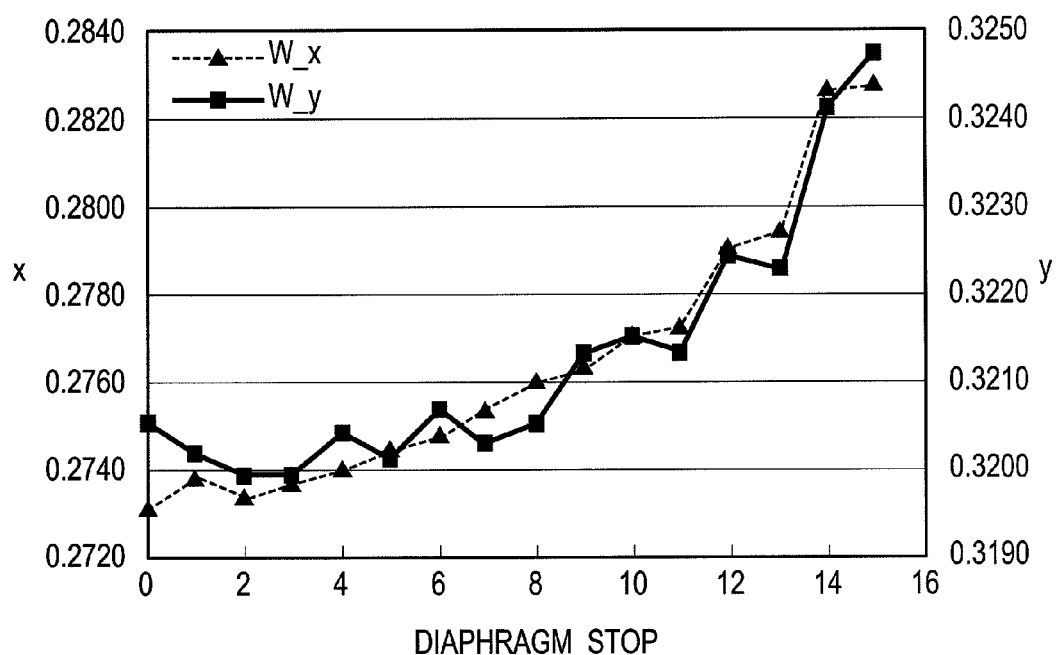
FIG. 6 is a characteristic chart showing a relationship between a diaphragm stop and chromaticity coordinates x and y.

FIG. 6 is a characteristic chart showing changes of chromaticity coordinates x and y with respect to the diaphragm stop, and shows that the chromaticity coordinates x and y change along with the change of the diaphragm stop. Specifically, when the diaphragm stop is increased, both of the chromaticity coordinates x and y tend to increase. Accordingly, when the diaphragm stop of the diaphragm mechanism 8 is controlled dynamically according to the picture signal, it is necessary to dynamically correct the color balance and the lightness of the picture signal in conjunction with the control of the diaphragm stop. The present embodiment, in addition to improving the dynamic performance by setting the black period, sets a diaphragm stop of the diaphragm mechanism 8 and suppresses the change of the color balance and the lightness caused by the change of the diaphragm stop by further setting a color balance correction value and a lightness correction value to prevent the image degradation, in the dynamic iris controller 30.

Next, a detailed configuration of the dynamic iris controller 30 shown in FIG. 1 will be explained. FIG. 2 is a block diagram showing the configuration of the dynamic iris controller 30. As shown in the drawing, the dynamic iris controller 30 includes a diaphragm and video-image controller 31, a diaphragm driver 32, a timing adjuster 33, and a video-image processor 34.

The timing adjuster 33 is connected to an operation unit 35, and sets a period during which the diaphragm mechanism 8 is fully closed, using a synchronization signal included in the picture signal as a reference, according to black time length data input from the operation unit 35 and the input picture signal. Then, the timing adjuster 33 outputs this setting to the diaphragm and video-image controller 31 as a timing signal.

The diaphragm and video-image controller 31 calculates an appropriate diaphragm stop of the diaphragm mechanism 8 according to the input picture signal and the timing signal, and outputs the diaphragm stop data to the diaphragm driver 32. Further, when the diaphragm stop of the diaphragm mechanism 8 is changed, the color balance and the lightness of the picture signal change. Thus, the diaphragm and video-image controller 31 outputs correction data for correcting the color balance and the lightness to the video-image processor 34. A setting method of the correction data will be described below.

The video-image processor 34 adjusts the picture signal so as not to change the color balance, according to the input picture signal and the correction data output from the diaphragm and video-image controller 31, and further performs signal processing so as to obtain appropriate lightness. It is possible to perform the lightness adjustment by adding an offset to the input picture signal, accumulating a gain, or controlling a gamma curve.

The diaphragm driver 32 outputs the diaphragm stop data to the diaphragm mechanism 8.

In the following, with reference to a block diagram of FIG. 3, a detailed configuration of the diaphragm and video-image processor 31 will be explained. As shown in FIG. 3, the diaphragm and video-image processor 31 includes an association setting unit 41, a video-image analyzer 42, a lightness adjuster 43, and a black period controller 44.

The video-image analyzer 42 analyzes a feature of the picture signal using the input picture signal. For example, the analysis includes calculating the lightness of the input signal and obtaining a histogram of the lightness, and a peak value or an average value of the lightness can be obtained as analysis data. Then, the video-image analyzer 42 outputs the obtained analysis data to the association setting unit 41.

Figures 4, 5:
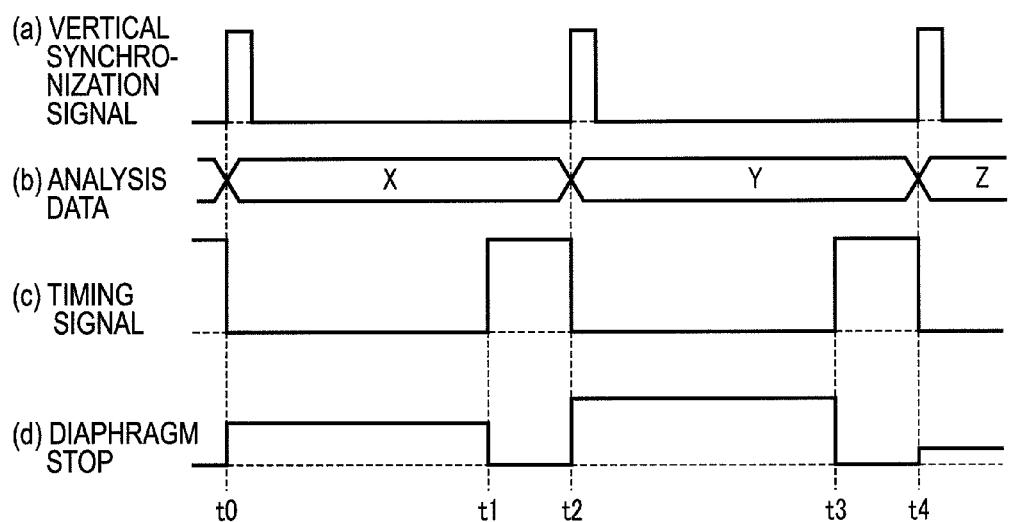
FIG. 4 is an association table showing association of a diaphragm stop, a color balance correction value, and a lightness correction value with respect to analysis data.
FIG. 5 is a timing chart showing changes in various kinds of signals in the projection-type image display apparatus according to the embodiment of the present invention.

The association setting unit 41 has a memory function and stores an association table as shown in FIG. 4. This association table sets a diaphragm stop of the diaphragm mechanism 8, a color balance correction value, and a lightness correction value with respect to the analysis data. Then, when the video-image analyzer 42 provides the analysis data, the association setting unit 41 sets a diaphragm stop of the diaphragm mechanism 8, a color balance correction value, and a lightness correction value by applying this analysis data to the association table. Specifically, when analysis data A0 is provided, the diaphragm stop, the color balance correction value, and the lightness correction value are set to S10, C0, and Y0, respectively. Note that, while an example is explained for the case of obtaining the diaphragm stop, color balance correction value, and lightness correction value using the association table in the association setting unit 41, it is also possible to obtain the respective data sets by calculation using the analysis data.

The lightness adjuster 43 adjusts the color balance correction value and the lightness correction value so as to obtain desired color balance and lightness, when setting a black period (period during which the diaphragm mechanism 8 is fully closed) in a video image frame, using the timing signal output from the timing adjuster 33 (refer to FIG. 2) and the correction data (color balance correction value and lightness correction value) output from the association setting unit 41. That is, the lightness correction value output from the association setting unit 41 is a correction value for the diaphragm stop without consideration of the black period, and therefore the lightness correction value is adjusted in consideration of the black period in the lightness adjuster 43. The specific processing includes calculating a lightness correction value of the input video image according to a period length defined by the timing signal. Obviously, a storage unit is provided for the lightness adjuster 43 and the lightness correction value may be adjusted by the use of an adjustment amount preliminarily set in this storage unit.

The black period controller 44 outputs the diaphragm stop data output from the association setting unit 41 to the diaphragm driver 32 shown in FIG. 2, and further outputs diaphragm stop data for fully closing the diaphragm mechanism 8 in the black insertion period which is defined by the timing signal, to the diaphragm driver 32.

Then, the above diaphragm stop and the correction data are determined in conjunction with the picture signal, and therefore updated for each frame fundamentally. However, when a data processing amount is significant, the processing can be performed across the plural frames.

Next, the changes of the analysis data, the timing signal and the diaphragm stop will be explained with reference to a timing chart shown in FIG. 5. FIG. 5(*a*) is a vertical synchronization signal included in the picture signal, and, in the case of a 60 Hz image, for example, data of one frame is output in a period of 0.017 seconds (=1/60 seconds). Further, FIG. 5(*b*) shows an analysis data, FIG. 5(*c*) shows a timing signal, and FIG. 5(*d*) shows a diaphragm stop of the diaphragm mechanism 8.

As shown in FIG. 5(*a*), the vertical synchronization signal is generated at time points of t0, t2, and t4. In a frame (first frame) of a period between the time points of t0 and t2, the analysis data is assumed to be X, and, in a frame (second frame) of a period between the time points of t2 and t4, the analysis data is assumed to be Y. Namely, when the analysis data X and Y of the respective frames are different from each other, the diaphragm stop, the color balance correction value, and the lightness correction value are updated at each of the time points t0, t2, and t4. So, the diaphragm stop in the first frame and the diaphragm stop in the second frame shown in FIG. 5(*d*) are different from each other.

Further, a first frame period between the time points of t1 and t2 is assumed to be a black period, and similarly a second frame period between the time points of t3 and t4 is assumed to be a black period. Accordingly, in the first frame, the diaphragm mechanism 8 is controlled to have a diaphragm stop according to the analysis data X for a period between the time points of t0 and t1, and, after that, the diaphragm stop is set to be fully closed for the period between the time points of t1 and t2. Similarly, in the second frame, the diaphragm mechanism 8 is controlled to have a diaphragm stop according to the analysis data Y for a period between the time points of t2 and t3, and, after that, the diaphragm stop is set to be fully closed for the period between the time points of t3 and t4.

That is, in the present embodiment, the timing signal is generated according to a predetermined black time length, and the black period is set according to this timing signal. Specifically, as shown in FIG. 5(*c*), a period (t1 to t2 or t3 to t4) in which the timing signal exhibits "H" is the black period. Further, in a period in which the timing signal exhibits "L" (period in which the diaphragm stop is not set to be fully closed), the diaphragm stop is set according to the analysis data by the use of the association table shown in FIG. 4 and the diaphragm mechanism 8 is controlled so as to have this diaphragm stop. Further, the color balance correction value and the lightness correction value are set according to the analysis data, the lightness correction value is adjusted according to the black period, and the picture signal is corrected by the color balance correction value and the lightness correction value after the adjustment.

In this manner, in the projection-type image display apparatus according to the present embodiment, the black period in the image data is set according to a black time length input from the operation unit 35 and the diaphragm stop of the diaphragm mechanism 8 is set to be fully closed during this black period, and thereby it is possible to improve a dynamic performance of a video image and resultantly it is possible to obtain a clear video image. Further, in a period other than the black period, the diaphragm stop is set according to the analysis data to improve the contrast, the color balance correction value and the lightness correction value are set to correct the picture signal, and thereby it is possible to suppress the changes of the color balance and the lightness due to the change of the diaphragm stop.

Further, by setting the black time length (i.e., black period) using the operation unit 35, it becomes possible to adjust a relationship between the black period and the lightness which is a trade-off therebetween, by the setting of the operator. For example, it becomes possible to perform setting so as to improve the moving image performance by setting a longer black period although the lightness is reduced slightly, and, on the other hand, it becomes possible to perform setting so as to increase the lightness by setting a shorter black period.

Moreover, when the analysis data is obtained, the diaphragm stop, the color balance correction value, and the lightness correction value are set by the use of the predetermined association table, and thereby it is possible to perform the setting of the correction data easily. Further, the lightness adjuster 43 is provided to adjust the lightness reduction due to provision of the black period, and thereby it is possible to further suppress the change of the lightness.

In addition, the lightness histogram is used as the analysis data, and thereby it becomes possible to perform control so as to obtain an appropriate diaphragm stop according to lightness balance.

While, hereinabove, a projection-type image display apparatus of the present invention has been explained according to the illustrated embodiment, the present invention is not limited to this embodiment and the configuration of each unit can be replaced by an optional configuration having a similar function.

For example, while, in the above described embodiment, explanation has been provided for the case of controlling the diaphragm stop of the diaphragm mechanism 8 in the illumination system shown in FIG. 1, the diaphragm stop of the diaphragm mechanism 20 in the projection system shown in FIG. 1 may be controlled.

What is claimed is:

1. A projection-type image display apparatus that controls an amount of light emitted from a light source with a diaphragm mechanism and projects a video image output from a projection lens onto a screen, the apparatus comprising,
   a controller configured to control the diaphragm mechanism, wherein
   the controller includes:
   a video-image analyzer configured to analyze a picture signal;
   a setting unit configured to set a diaphragm stop of the diaphragm mechanism, a color balance correction value, and a lightness correction value according to analysis data analyzed in the video-image analyzer;
   a black period controller configured to set a black period in the picture signal according to a predetermined black time length;
   a diaphragm driver configured to output a drive signal to the diaphragm mechanism such that the diaphragm stop has a first state and a second state in one frame, wherein the first state is a state for the black period set by the black period controller,
   in the first state, the diaphragm stop is set to be fully closed,
   the second state is a state for a period other than the black period,
   in the second state, the diaphragm stop is set to have a value set by the setting unit, and
   the setting of the diaphragm stop in the first state is independent of the setting of the diaphragm stop in the second state; and
   a video-image processor configured to correct color balance and lightness of the picture signal using the color balance correction value and the lightness correction value set by the setting unit.

2. The projection-type image display apparatus according to claim 1, further comprising an operation unit configured to receive an input relating to the black time length.

3. The projection-type image display apparatus according to claim 1, wherein the setting unit has an association table in which the analysis data is associated with a diaphragm stop of the diaphragm mechanism, a color balance correction value, and a lightness correction value, and sets, when the analysis data is provided, the diaphragm stop of the diaphragm mechanism, the color balance correction value, and the lightness correction value with reference to the association table.

4. The projection-type image display apparatus according to claim 1, further comprising a lightness adjuster configured to adjust the lightness correction value set by the setting unit, according to the black time length.

5. The projection-type image display apparatus according to claim 1, wherein the video-image analyzer configured to set the analysis data according to a lightness histogram of an input signal.

6. The projection-type image display apparatus according to claim 5, wherein the video-image analyzer sets the analysis data according to a peak value or an average value of the histogram.

\* \* \* \* \*